United States Patent
Matsushima et al.

(10) Patent No.: US 9,438,797 B2
(45) Date of Patent: Sep. 6, 2016

(54) ELECTRONIC APPARATUS AND CONTROL METHOD THEREOF

(71) Applicant: CANON KABUSHIKI KAISHA, Tokyo (JP)

(72) Inventors: Shuichiro Matsushima, Tokyo (JP); Rui Nabeshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 14/582,548

(22) Filed: Dec. 24, 2014

(65) Prior Publication Data

US 2015/0189177 A1 Jul. 2, 2015

(30) Foreign Application Priority Data

Dec. 27, 2013 (JP) ................................. 2013-273177
Dec. 27, 2013 (JP) ................................. 2013-273178

(51) Int. Cl.
*H04N 5/232* (2006.01)

(52) U.S. Cl.
CPC ...... *H04N 5/23241* (2013.01); *H04N 5/23222* (2013.01); *H04N 5/23245* (2013.01); *H04N 5/23293* (2013.01)

(58) Field of Classification Search
CPC .................. H04N 5/23241; H04N 2005/4428
See application file for complete search history.

(56) References Cited

U.S. PATENT DOCUMENTS

| 8,779,923 B2* | 7/2014 | Fujiwara | B60L 11/1846 340/10.1 |
| 2006/0033836 A1* | 2/2006 | Umeyama | H04N 5/23241 348/372 |
| 2008/0007647 A1* | 1/2008 | Masuda | H02J 7/0055 348/372 |

FOREIGN PATENT DOCUMENTS

| JP | 2005341775 A | * 12/2005 |
| JP | 2007-282471 A | 10/2007 |
| WO | 2009/149065 A2 | 12/2009 |

OTHER PUBLICATIONS

Search Report issued on Jun. 22, 2015, that issued in the corresponding United Kingdom Application No. 1422810.0.
Search Report issued on Mar. 2, 2016, that issued in the corresponding United Kingdom Application No. 1522812.5.

* cited by examiner

*Primary Examiner* — James Hannett
(74) *Attorney, Agent, or Firm* — Cowan, Liebowitz & Latman, P.C.

(57) ABSTRACT

An electronic apparatus comprises a certification unit configured to certificate a mounted battery, and a control unit configured to perform control such that, if an instruction to execute first processing is given before certification processing by the certification unit is completed, the first processing is not executed before the certification processing is completed, and if an instruction to execute second processing is given before the certification processing by the certification unit is completed, the second processing is executed before the certification processing is completed.

38 Claims, 14 Drawing Sheets

F I G. 1
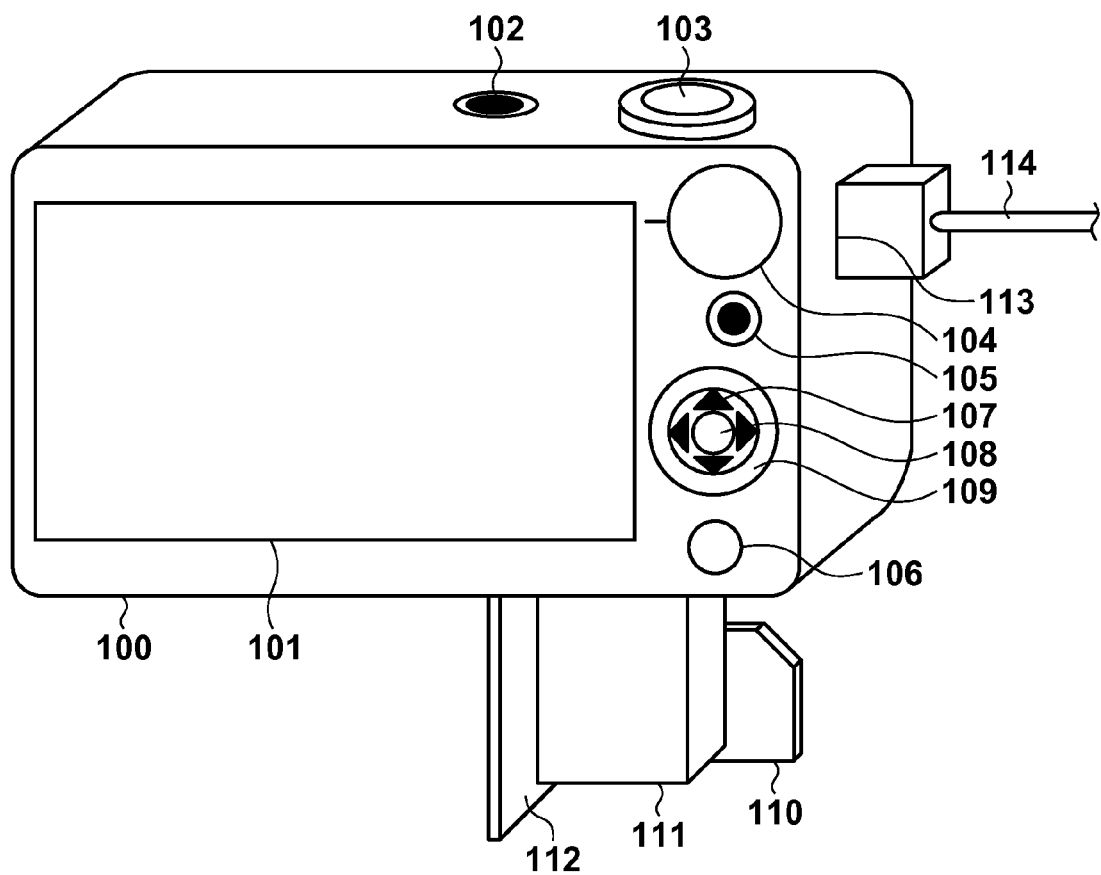

ELECTRONIC APPARATUS AND CONTROL METHOD THEREOF

BACKGROUND OF THE INVENTION

1. Field of the Invention

The present invention relates to an electronic apparatus that is driven by a battery, and a control method thereof.

2. Description of the Related Art

In recent years, defects and malfunctions of electronic apparatuses due to use of a counterfeit battery have been reported. In this context, "counterfeit battery" means an illegal battery that is misrepresented as a genuine part produced by a manufacturer, and does not include a so-called third-party battery. A counterfeit battery may lack a protection device or a safety part that satisfies predetermined integrity standards, the protection device or the safety part being included in the genuine part. Accordingly, a counterfeit battery may cause a defect or malfunction due to abnormal heat generation. However, such a counterfeit battery is commercially available and misrepresented as a genuine part, and thus when a user buys a battery, it is not easy for the user to accurately distinguish between genuine batteries of manufacturers from counterfeit batteries. Accordingly, the number of cases where a user who wanted to buy a genuine battery buys a counterfeit battery by mistake, and the user uses the counterfeit battery without realizing it is a counterfeit battery is not negligible. Therefore, there is a demand for a countermeasure to prevent a defect or malfunction of an electronic apparatus due to a counterfeit battery from occurring.

For example, Japanese Patent Laid-Open No. 2007-282471 discloses a method in which, using a certification function to determine whether or not a battery mounted on a transportable electronic apparatus is a genuine battery, a warning is displayed and use of a battery is restricted when the battery is not a genuine battery but a counterfeit battery.

The above-described Japanese Patent Laid-Open No. 2007-282471 is a method in which predetermined processing is executed based on a result of battery certification, making it possible to prevent a defect or malfunction due to use of a counterfeit battery from occurring.

However, when the transportable electronic apparatus is a camera, and a shooting operation is forbidden until the battery certification processing is completed, the user may miss a sudden shooting opportunity. That is, processing that needs to be performed promptly is inconvenient if it is configured not to be performed unless the battery certification processing is completed.

On the other hand, there is also processing that is inconvenient if it can be executed before the battery certification processing is completed. For example, when battery certification results in failure after connection to an external apparatus has been established, immediate disconnection wastes a consumed power and a processing load of the external apparatus, which serves as a connection counterpart.

Furthermore, since, in moving image shooting, the throughput of the camera is typically high and shooting takes a prolonged time period possibly generating heat, the risk of a malfunction or defect increases when a counterfeit battery is used.

SUMMARY OF THE INVENTION

The present invention has been made in consideration of the aforementioned problems, and provides an electronic apparatus that prevents processing that needs to be performed promptly from being stopped due to battery certification, and a method for controlling the same.

In order to solve the aforementioned problems, the present invention provides an electronic apparatus comprising: a certification unit configured to certificate a mounted battery; and a control unit configured to perform control such that, if an instruction to execute first processing is given before certification processing by the certification unit is completed, the first processing is not executed before the certification processing is completed, and if an instruction to execute second processing is given before the certification processing by the certification unit is completed, the second processing is executed before the certification processing is completed.

In order to solve the aforementioned problems, the present invention provides a control method of an electronic apparatus comprising the steps of: certifying a mounted battery; and performing control such that, if an instruction to execute first processing is given before the certification processing is completed, the first processing is not executed before the certification processing is completed, and if an instruction to execute second processing is given before the certification processing is completed, the second processing is executed before the certification processing is completed.

In order to solve the aforementioned problems, the present invention provides an electronic apparatus comprising: a certification unit configured to certificate a mounted battery; and a control unit configured to perform control such that: first processing is started before certification processing by the certification unit is completed, and the first processing is stopped if the certification processing by the certification unit is completed after the start of the first processing, and the certification is not successful, and second processing is started before the certification processing by the certification unit is completed, and the second processing is continued if the certification processing by the certification unit is completed after the start of the second processing, and the certification is not successful.

In order to solve the aforementioned problems, the present invention provides a control method of an electronic apparatus comprising the steps of: certifying a mounted battery; and performing control such that; if first processing is started before certification processing is completed, the certification processing is completed after the start of the first processing, and if certification is not successful, the first processing is stopped, and if second processing is started before the certification processing is completed, the certification processing is completed after the start of the second processing, and if certification is not successful, the second processing is continued.

According to the present invention, it is possible to prevent processing that needs to be performed promptly from being stopped due to battery certification.

Further features of the present invention will become apparent from the following description of embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 1 is an external view illustrating an electronic apparatus according to the present embodiment.

FIGS. 11A to 11G show screen display examples in the respective modes of FIG. 4.

DESCRIPTION OF THE EMBODIMENTS

Hereinafter, embodiments for implementing the present invention will be described in detail with reference to the accompanying drawings.

<Apparatus Configuration>

Figure 2:
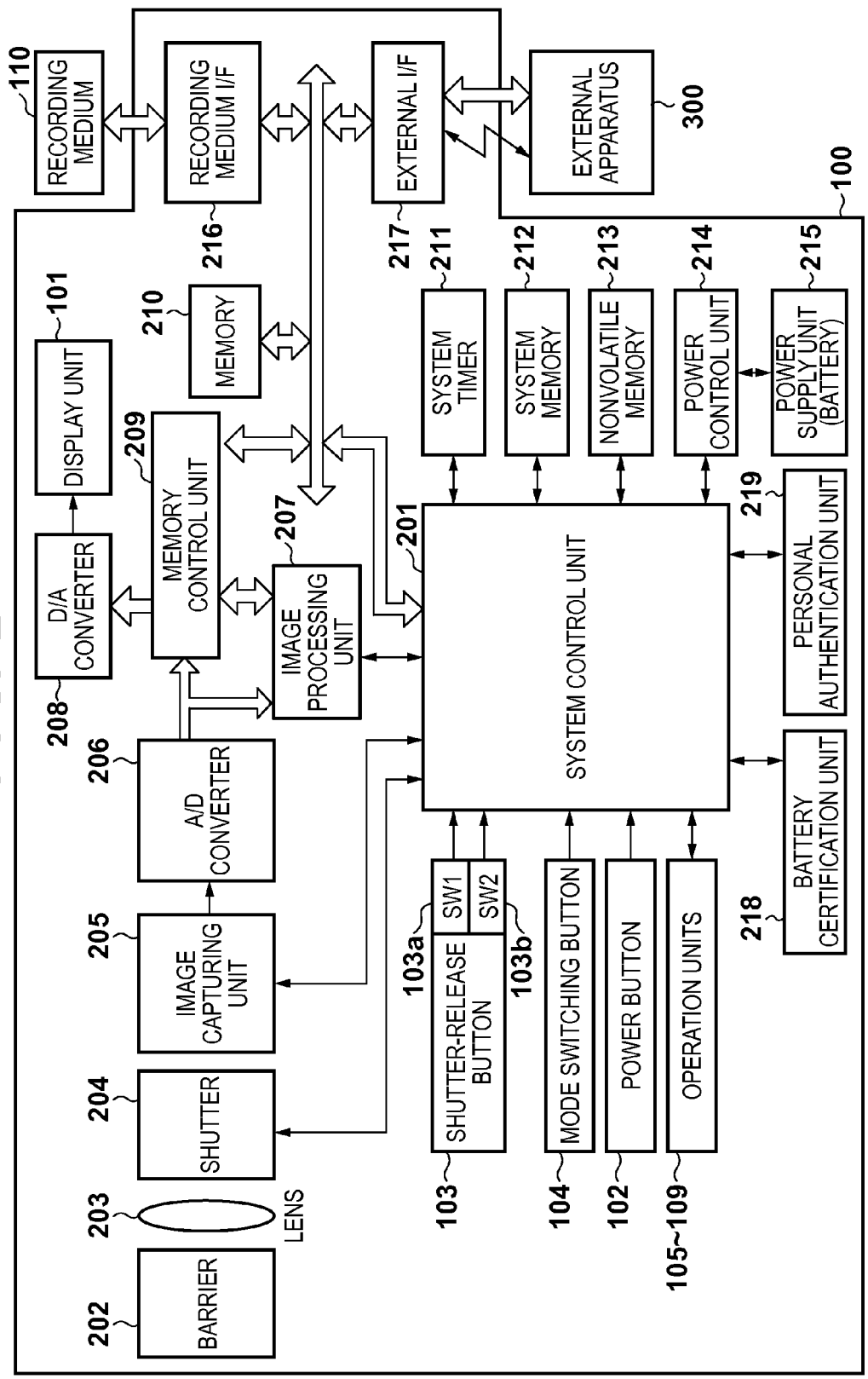
FIG. 2 is a block diagram illustrating a configuration of the electronic apparatus according to the present embodiment.

Reference will be made to FIGS. 1 and 2 to describe the functions and external appearance of an electronic apparatus (a digital camera is taken as an example thereof in this embodiment) according to this embodiment to which the present invention is applied.

In FIG. 1 which shows an external appearance of a digital camera 100 according to the present embodiment, a display unit 101 displays images and various information. A power button 102 switches between power on and power off. A shutter-release button 103 is an operation unit for giving a shooting instruction. A mode switching button 104 is an operation unit for changing over among various modes. A moving image recording button 105 is an operation unit for giving an instruction for starting a moving image recording. A menu button 106 is an operation unit for displaying a menu screen that enables various settings of the digital camera 100. The user can make various settings intuitively by using the menu screen displayed on the display unit 101, four-direction button 107 of which up, down, left, right buttons are integrally formed, a SET button 108 and a controller wheel 109. The controller wheel 109 is a rotatable operation member.

A recording medium 110 is a medium such as a memory card and accommodated in a recording medium slot (not shown). A battery 111 comprises a primary battery such as an alkaline battery or a lithium battery, a secondary battery such as a NiCd battery, a NiMH battery, or a Li battery and is accommodated in a battery box (not shown). The recording medium 110 accommodated in the recording medium slot makes it possible to communicate with the digital camera 100. A cover 112 covers the recording medium slot and battery box.

A connector 113 is an interface that connects a connection cable 114 with a digital camera 100.

In FIG. 2 which shows an internal configuration of a digital camera 100 according to the present embodiment, a photographing lens 203 includes a zoom lens and a focusing lens. A shutter 204 has a diaphragm function. An image capturing unit 205 is an image sensor, which is constituted by a CCD or CMOS or the like, for converting the optical image of a subject to an electric signal. An A/D converter 206 converts an analog signal to a digital signal. The A/D converter 206 is used to convert an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 209. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and supplies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. A predetermined signal processing of the digital signal once converted by the A/D converter 206 and stored in the memory 210 is performed by the image processing unit 207. In this manner, the digital signals stored in the memory 210 are converted into analog signals, and the analog signals are successively transmitted to the display unit 101 so as to be displayed thereon, making it possible to realize an electronic view finder (EVF) functionality and to perform through-the-lens image (hereinafter, through image) display (live-view display). Note that the through image is rephrased into a live-view image, and the through image display is rephrased into a live-view. In other words, the terms "live-view image" and "through image" are interchangeable.

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A power button 102, shutter-release button 103, mode switching button 104, and the other operation units 105 to 109 are operation members for inputting various types of instructions into the system control unit 201.

The mode switching button 104 switches the operation mode of the system control unit 201 to any of a still image shooting mode, a moving image recording mode, and a reproduction mode, external apparatus connecting mode, menu mode and the other modes. The still image shooting mode includes an automatic shooting mode, an automatic scene determination mode, a manual mode, various types of scene modes in which different settings are configured for individual shooting scenes, a program AE mode, a custom mode, and the like. Using the mode switching button 104, the mode is directly switched to any of the plurality of modes included in the still image shooting mode. Alternatively, it is also possible to switch, using the mode switching button 104, to the still image shooting mode and then to switch, using another operation member, to any of the plurality of modes included in the still image shooting mode. Similarly, also the moving image recording mode may include a plurality of modes.

While the shutter-release button 103 is being operated, that is, pressed half-way (the shooting preparation instruction), the first shutter switch 103a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter-release button 103 is completed, that is, the shutter-release button 103 is pressed fully (the shooting instruction), the second shutter switch 103b is turned on and generates a second shutter switch signal SW2. Upon receiving the second shutter switch signal SW2, the system control unit 201 starts a series of shooting processing from reading out the signal from the image capturing unit 205 to writing of image data to the recording medium 110 (shooting and recording sequence).

An operation unit other than operation units 105 to 109 includes a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

By selecting various functional icons displayed on the display unit 101, appropriate functions for each situation are assigned to the touch panel, and the touch panel thus acts as various function buttons. Examples of these function buttons include an end button, a back button, an image scrolling button, a jump button, a narrow-down button, an attribute change button. For example, a menu screen that enables various settings to be made is displayed on the display unit 101 by pressing a menu button 106. The user can make various settings intuitively by using the menu screen, which is displayed on the display unit 101, four-direction (up, down, left, right) buttons 107 and a SET button 108, and a controller wheel 109.

The controller wheel 109 is used together with the four-direction buttons 107 as when a selection item is specified. When the controller wheel 109 is turned, an electrical pulse signal is generated in accordance with the amount of rotation, and the system control unit 201 controls each unit of the digital camera 100 based upon the pulse signal. The angle through which the controller wheel 109 has been turned and how many times it has been turned can be determined by the pulse signal. It should be noted that the controller wheel 109 can be any operating member so long as it is an operating member whose rotation can be detected. For example, it can be a dial operating member in which the controller wheel 109 per se is rotated to generate the pulse signal in accordance with a turning operation by the user. Further, it can be a device (a so-called touch wheel) that detects an operation such as the revolution of the user's finger on the controller wheel 109 without by the controller wheel 109 itself being rotated.

A power control unit 214 is constituted by, for example, a battery detection circuit, a DC-DC converter, a switch circuit for changing over the block to be supplied with power, and detects whether the battery 111 has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 110.

A power supply unit 215 as the battery 111 comprises a primary battery such as an alkaline battery or a lithium battery, a secondary battery such as a NiCd battery, a NiMH battery, or a Li battery, or an AC adaptor. A recording medium interface (I/F) 216 is for interfacing with the recording medium 110 such as the memory card. The recording medium 110 is a recording medium such as a memory card for recording shot images, and constituted by a semiconductor memory, a magnetic disk, or the like.

An external I/F 217 is communicably connected to an external apparatus 300 via a wireless antenna or a wired cable, and transmits and receives a video image or sound. The external I/F 217 is also connectable to a wireless LAN (Local Area Network) or the Internet. The external I/F 217 can transmit image data (including a through image) captured by the image capturing unit 205 and an image file stored in the recording medium 110 to the external apparatus 300, or can receive image data or various other information from the external apparatus 300.

A battery certification unit 218 communicates with the battery 111 mounted in the battery box (not shown), and determines whether or not the battery is a genuine battery.

The digital camera 100 of the present embodiment can perform shooting using an automatic focus technique, such as single center point AF or face AF. "Single center point AF" refers to AF on a single central position on a shooting screen. "Face AF" refers to AF on a face (main face) on a shooting screen that was detected using a face detection function.

Hereinafter, the face detection function will be described.

The system control unit 201 reads out image data (including a through image) stored in the memory 210, and detects edge elements via bandpass filters in the horizontal direction and the vertical direction. Then, the system control unit 201 performs pattern matching of the detected edge elements, and extracts candidate groups of eyes, noses, mouths, and ears. Furthermore, from among the candidate groups of eyes extracted by pattern matching, the system control unit 201 determines eyes that satisfy a preset condition (for example, a distance between two eyes, the inclination thereof, or the like) as a pair of eyes, and narrows down to pairs of eyes as the candidate groups of eyes. Then, the system control unit 201 correlates the narrowed down candidate group of eyes with the corresponding other parts (nose, mouth, and ear) constituting the face, or detects a face via a preset non-face condition filter to generate feature information on the face according to the detection result, and stores the information in a system memory 212. Note that, in order to notify the user of the detected face, it is also possible to perform display on the display unit 101 while superimposing a face frame or the like on the image depending on the coordinates of the face position or size of the face, for example.

By analyzing the image data that is displayed in Live-view or playback-view in the above-described manner, it is possible to extract feature information on a subject in an image. According to the present embodiment, face information is taken as an example of feature information on a subject, but there are various other types of information on red-eye determination, eye detection, shut-eye detection, smile face detection or the like.

Note that it is possible to perform face AE, face FE, face WB at the same time with face AF. The face AE is a technique for optimizing the exposure of the entire screen according to the brightness of the detected face. The face FE is a technique for modulating flash light with a focus on the detected face. The face WB is a technique for optimizing the white balance of the entire screen according to the color of the detected face.

A personal authentication unit 219 has the function to authenticate a specific person from the faces detected in the above-described manner with reference to a database in which the feature information on the face is registered. Note that the system control unit 201 may have this personal authentication function.

Note that the hardware configuration is not limited to that shown in FIG. 2, and a configuration is also possible in which, for example, a single item of hardware performs display control, communication control, recording control, image processing control, and the like, so as to function as each unit or block of the digital camera 100. Alternatively, it is also possible that a plurality of items of hardware operate in cooperation with each other to function as a single unit or block.

<Example of Screen Display>

Hereinafter, examples of screen display in processing in the modes according to the present embodiment will be described with reference to FIGS. 3A to 3F.

The following will describe the transition of the display screen, in still image shooting and moving image recording, from when the digital camera 100 is activated (turned on) until battery certification processing is completed.

Figure 3A:
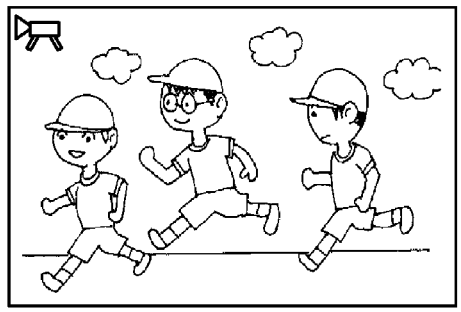
FIGS. 3A to 3F show screen display examples in respective modes according to the present embodiment.

FIG. 3A shows the state in the moving image recording mode in which a through image is displayed.

Figure 3D:
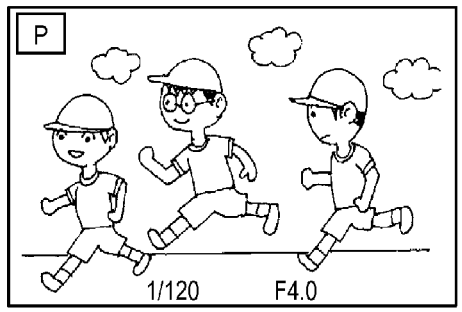
Figure 3B:
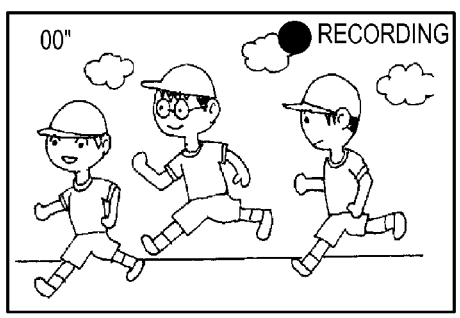

FIG. 3B shows the state in which an instruction to start recording a moving image is received while the through image of FIG. 3A is displayed. Irrespective of whether or not battery certification has been completed, moving image recording processing starts upon receiving the instruction to start recording a moving image.

Figure 3E:
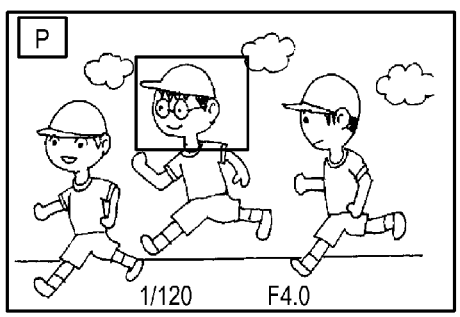
Figure 3C:
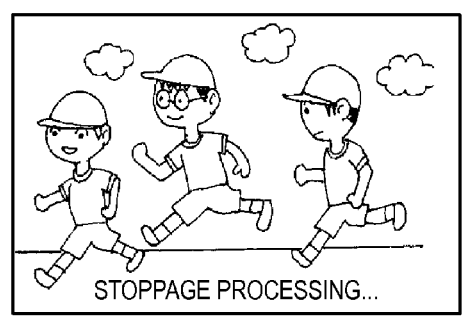

FIG. 3C shows the state in which battery certification has failed during recording of a moving image of FIG. 3B and the moving image recording is stopped. During recording of a moving image, the throughput of the camera is high and recording takes a prolonged time period possibly generating heat, and thus the risk of a malfunction or defect is considered to increase when a counterfeit battery is used. In order to prevent the situation, by suspending the moving image recording when battery certification fails in the moving image recording mode, it is possible to prevent abnormal heat generation when a counterfeit battery is used. Note that, when battery certification is successful, the moving image recording is continued. Furthermore, when the moving image recording time has been determined in advance and is short, it is considered that heat generation due to use of a counterfeit battery hardly occurs, and thus recording may be continued.

FIG. 3D shows the state in the still image shooting mode in which a through image is displayed.

FIG. 3E shows the state in which AE/AF operation is performed in response to a shooting preparation instruction (SW1 is on) during display of the through image of FIG. 3D.

Figure 3F:
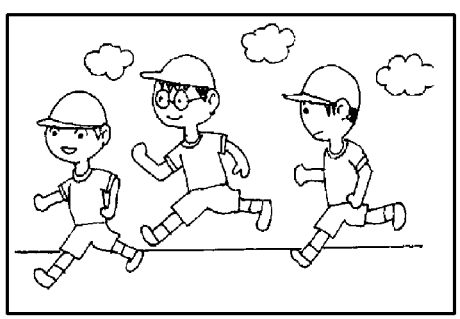

FIG. 3F shows the state in which still image shooting/recording operation is performed in response to a shooting instruction (SW2 is on) during the AE/AF operation of FIG. 3E. In the still image shooting mode, if the shooting operation is forbidden until battery certification processing is completed, a user may miss a sudden shooting opportunity. Accordingly, in the still image shooting mode, when a shooting instruction is accepted before battery certification fails and shooting/recording of a still image is started, the operation is not suspended until recording is completed, but when a shooting instruction is received after the battery certification has failed, the recording operation is suppressed. It is thus possible to prevent a user from missing a shooting opportunity in still image shooting, by accepting a shooting instruction before battery certification fails and performing a recording operation.

Furthermore, when still images are sequentially shot, it is determined before the start of the recording operation whether or not battery certification is completed, and shooting is suspended in case of a certification failure. Furthermore, in self-timer shooting, shooting is suspended if the recording operation has not been started even during counting down.

<Operation after Activation of Camera>

The following will describe an operation after activation of the camera that includes processing in case of a battery certification failure according to the present embodiment, with reference to FIG. 4 to FIGS. 11A to 11G.

Note that the procedure of FIGS. 4 to 10 is executed by the system control unit 201 expanding programs stored in the nonvolatile memory 213 on the system memory 212 and executing the expanded programs so as to control the components. Furthermore, the procedure of FIG. 4 starts when the power button 102 is pressed in the state in which the battery 111 is mounted to turn on power.

In step S401, the system control unit 201 starts battery certification processing using the battery certification unit 218.

In step S402, the system control unit 201 determines whether or not a battery certification completion flag is on. The battery certification completion flag is a variable that is set to on when battery certification processing is completed and stored in the system memory 212. As a result of the determination, if battery certification has been completed, the process advances to step S406, and if battery certification has not been completed, the process advances to step S403.

In step S403, the system control unit 201 determines whether or not a battery certification completion notification has been received from the battery certification unit 218. As a result of the determination, if a battery certification completion notification has been received, the process advances to step S404, and otherwise to step S406.

In step S404, the system control unit 201 determines whether or not the battery certification unit 218 has succeeded in battery certification. As a result of the determination, if battery certification is successful (that is, the battery is determined to be a genuine battery), the process advances to step S405, and if battery certification fails (that is, the battery is determined not to be a genuine battery), the process advances to step S414.

In step S405, the system control unit 201 turns on the battery certification completion flag, and stores the turned on flag in the system memory 212.

Furthermore, in steps S414 and S415, the system control unit 201 executes processing in case of a battery certification failure to turn on the battery certification completion flag, and stores the turned on flag in the system memory 212, and the process advances to step S413.

In step S406, the system control unit 201 determines in which mode the camera operates based on the position of the mode switching button 104. If it is determined in step S406 that the camera operates in the still image shooting mode, the process advances to step S407; if it is determined that the camera operates in the moving image recording mode, the process advances to step S408; if it is determined that the camera operates in the reproduction mode, the process advances to step S409; if it is determined that the camera operates in the external apparatus connecting mode, the process advances to step S410; if it is determined that the camera operates in the menu mode, the process advances to step S411; or if it is determined that the camera operates in another mode, the process advances to step S412. The processing of these modes will be described in detail later. Note that, although the other mode includes a plurality of processes, detailed descriptions thereof are omitted since they do not significantly relate to the present invention.

When the processes of the above-described modes have been completed, the process advances to step S413, where the system control unit 201 determines whether or not there is a power off request based on whether or not the power button 102 has been pressed or an automatic turning off time has elapsed. If there is not a power off request, the process returns to step S402, and if there is a power off request, the system control unit 201 turns off the power and ends this processing.

<Processing in Case of Battery Certification Failure>

Figure 4:
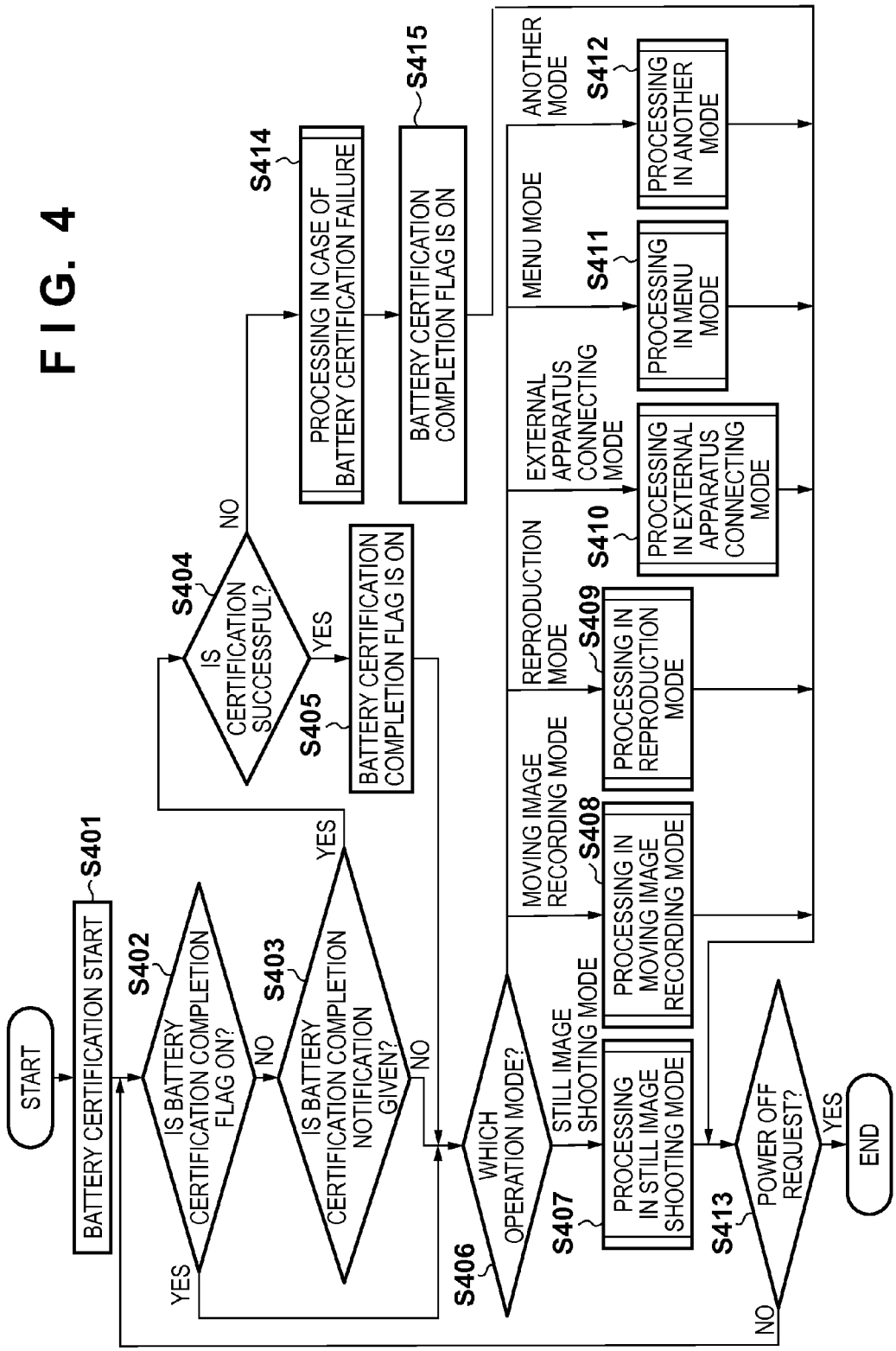
FIG. 4 is a flowchart illustrating processing after a camera was started according to the present embodiment.
Figure 5:
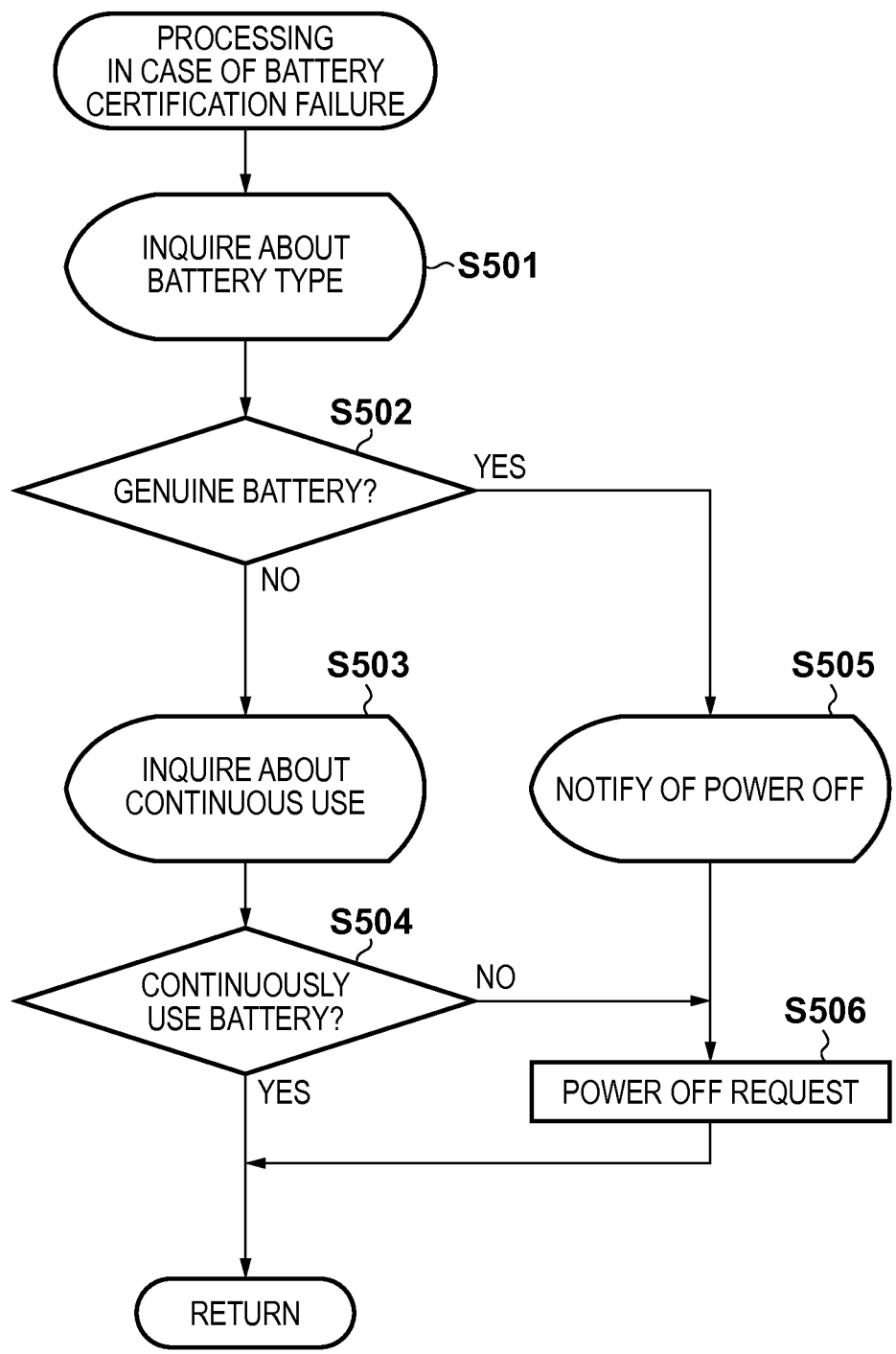
FIG. 5 is a flowchart illustrating processing in case of a battery certification failure of FIG. 4.

The following will describe the processing in case of a battery certification failure in step S414 of FIG. 4 with reference to FIG. 5.

In step S501, the system control unit 201 displays, on the display unit 101, a confirmation screen as shown in FIG. 11A that inquires the type of a battery, and inquires of a user whether or not he or she thinks that the battery is a genuine battery. The user can select whether or not he or she thinks that the battery is a genuine battery by selecting any one of the selection items displayed on the confirmation screen of FIG. 11A.

In step S502, the system control unit 201 determines, based on the selected item of FIG. 11A, that the user thinks that the battery is a genuine battery ("YES" of FIG. 11A is selected), or that the user recognizes that the battery is not a genuine battery ("NO" of FIG. 11A is selected). As a result of the determination, if "NO" (the user recognizes that the battery is not a genuine battery) is selected, the process advances to step S503, and if "YES" (the user thinks that the battery is a genuine battery) is selected, the process advances to step S505.

In step S503, the system control unit 201 displays, on the display unit 101, a confirmation screen as shown in FIG. 11B that inquires whether or not to continue using the non-genuine battery, and inquires of the user whether or not he or she will continue using the non-genuine battery.

In step S504, the system control unit 201 determines, based on the selected item of FIG. 11B, whether or not the user will continue using the non-genuine battery. As a result of the determination, if the user will continue using the non-genuine battery (if "YES" of FIG. 11B is selected), the system control unit 201 ends the present processing, and if the user will not continue using the non-genuine battery (if "NO" of FIG. 11B is selected), the process advances to step S506.

In step S505, the system control unit 201 displays, on the display unit 101, a screen as shown in FIG. 11C that notifies the user that power will be turned off because of the use of a battery other than a genuine battery, and notifies the user that power will be turned off. In this case, it can be assumed that the user misrecognizes that the battery in use is a genuine battery although it is not a genuine battery.

In step S506, the system control unit 201 gives a power off request, the power control unit 214 turns off power, and ends the present procedure.

<Processing in Still Image Shooting Mode>

Figure 6:
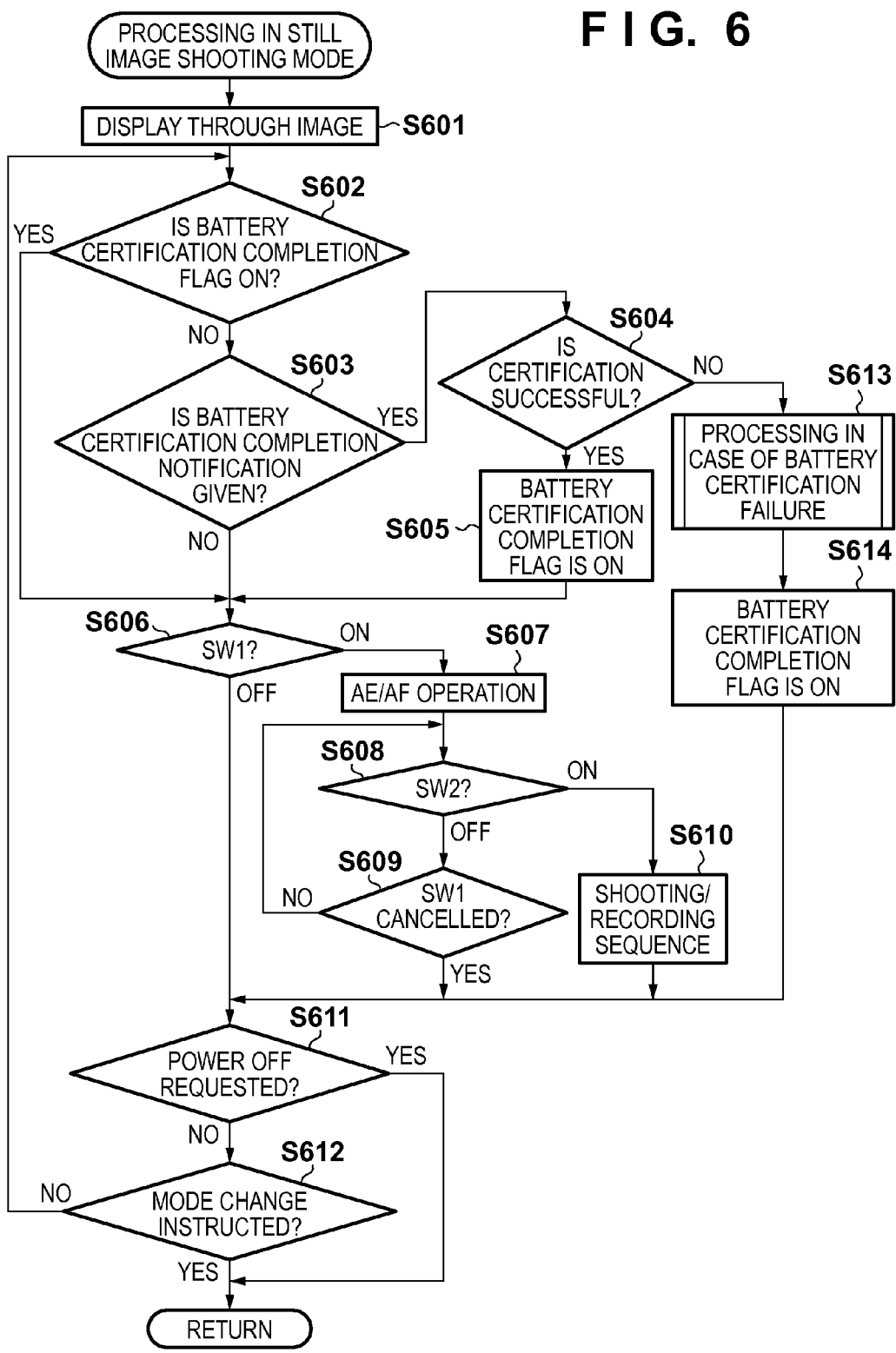
FIG. 6 is a flowchart illustrating processing in a still image shooting mode of FIG. 4.

The following will describe the processing in the still image shooting mode in step S407 of FIG. 4 with reference to FIG. 6.

In step S601, the system control unit 201 displays a through image (live-view image) on the display unit 101.

In step S602, the system control unit 201 determines whether or not the battery certification completion flag is on, that is, whether or not battery certification has been completed. As a result of the determination, if battery certification has been completed, the process advances to step S606, and if battery certification has not been completed, the process advances to step S603.

In step S603, the system control unit 201 determines whether or not a battery certification completion notification has been received from the battery certification unit 218.

If a battery certification completion notification has been received, the process advances to step S604, and if a battery certification completion notification has not been accepted, the process advances to step S606.

In step S604, the system control unit 201 determines whether or not the battery certification unit 218 has succeeded in battery certification. As a result of the determination, if battery certification is successful, the process advances to step S605, and if battery certification fails, the process advances to step S613.

In step S605, the system control unit 201 turns on the battery certification completion flag, and stores the turned on flag in the system memory 212.

In step S606, the system control unit 201 determines whether or not a shooting preparation instruction has been given (SW1 is on). As a result of the determination, if the SW1 is off, the process advances to step S611, and if the SW1 is on, the process advances to step S607.

In step S607, the system control unit 201 performs an AE/AF operation.

In step S608, the system control unit 201 determines whether or not a shooting instruction has been given (SW2 is on). As a result of the determination, if the SW2 is off, the process advances to step S609, and if the SW2 is on, the process advances to step S610.

In step S609, the system control unit 201 determines whether or not the ON state of the SW1 has been cancelled (OFF). As a result of the determination, if the SW1 is off, the process advances to step S611, and if the SW1 is on, the process returns to step S608.

In step S610, the system control unit 201 performs shooting/recording sequence processing. That is, a series of shooting processes is performed, the series of shooting processes including processing for reading a signal from the image capturing unit 205, image processing (including a development processing of raw data) for converting the read signal into an image file, processing for writing the image file into the recording medium 110, and the like.

In step S611, the system control unit 201 determines whether or not there is a power off request. As a result of the determination, if there is not a power off request, the process advances to step S612, and if there is a power off request, the system control unit 201 ends the present processing.

In step S612, the system control unit 201 determines whether or not a mode change instruction has been given by the mode switching button 104, and if a mode change instruction has not been given, the process returns to step S602, and if a mode change instruction has been given, the system control unit 201 ends the present processing.

In steps S613 and S614, the system control unit 201 executes the processing in case of a battery certification failure to turn on the battery certification completion flag, and stores the turned on flag in the system memory 212, and the process advances to step S611.

Accordingly, in still image shooting mode, after a shooting preparation instruction is given (SW1 is on), processing ("YES" in step S603) in accordance with the battery certification completion notification is not executed until the ON state of the SW1 is cancelled ("YES" in step S609) or the shooting/recording sequence is completed (step S610). Therefore, even if a shooting instruction has been given before battery certification is completed, battery certification is completed during the still image shooting/recording sequence, and if certification results in failure (it is determined that the battery is not a genuine battery), still image shooting is not suspended. That is, in the still image shooting mode, it is possible to execute still image shooting immediately after power is turned on, allowing a user to perform shooting without missing a sudden shooting opportunity. On the other hand, if a battery certification completion notification is received when the user does not intend to shoot a still image (when the SW1 is off) and certification fails, power may be turned off by the processing in case of a battery certification failure (step S613). With this, it is possible to prevent a defect, such as a phenomenon in which unnecessary processing is executed when the user uses a battery that is not a genuine battery in an unintended manner, from occurring without interfering in still image shooting on a sudden shooting opportunity. When battery certification is completed during shooting of a still image and certification results in failure, the still image recording processing in progress of shooting is executed to the end, and after the completion of the still image shooting processing, the processing in case of a battery certification failure is executed.

<Processing in Moving Image Recording Mode>

Figure 7A:
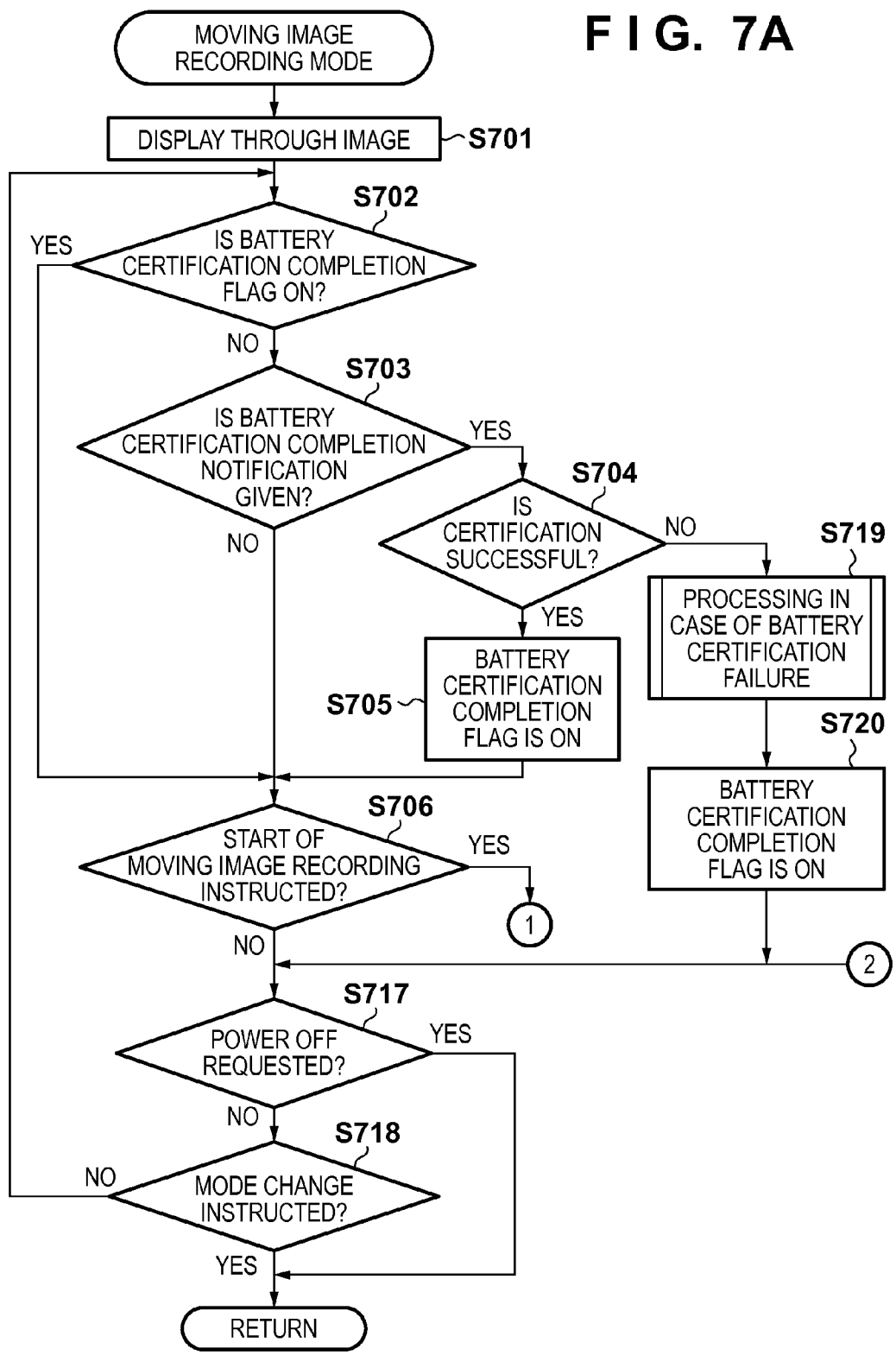
FIGS. 7A and 7B are flowcharts illustrating processing in a moving image recording mode of FIG. 4.
Figure 7B:
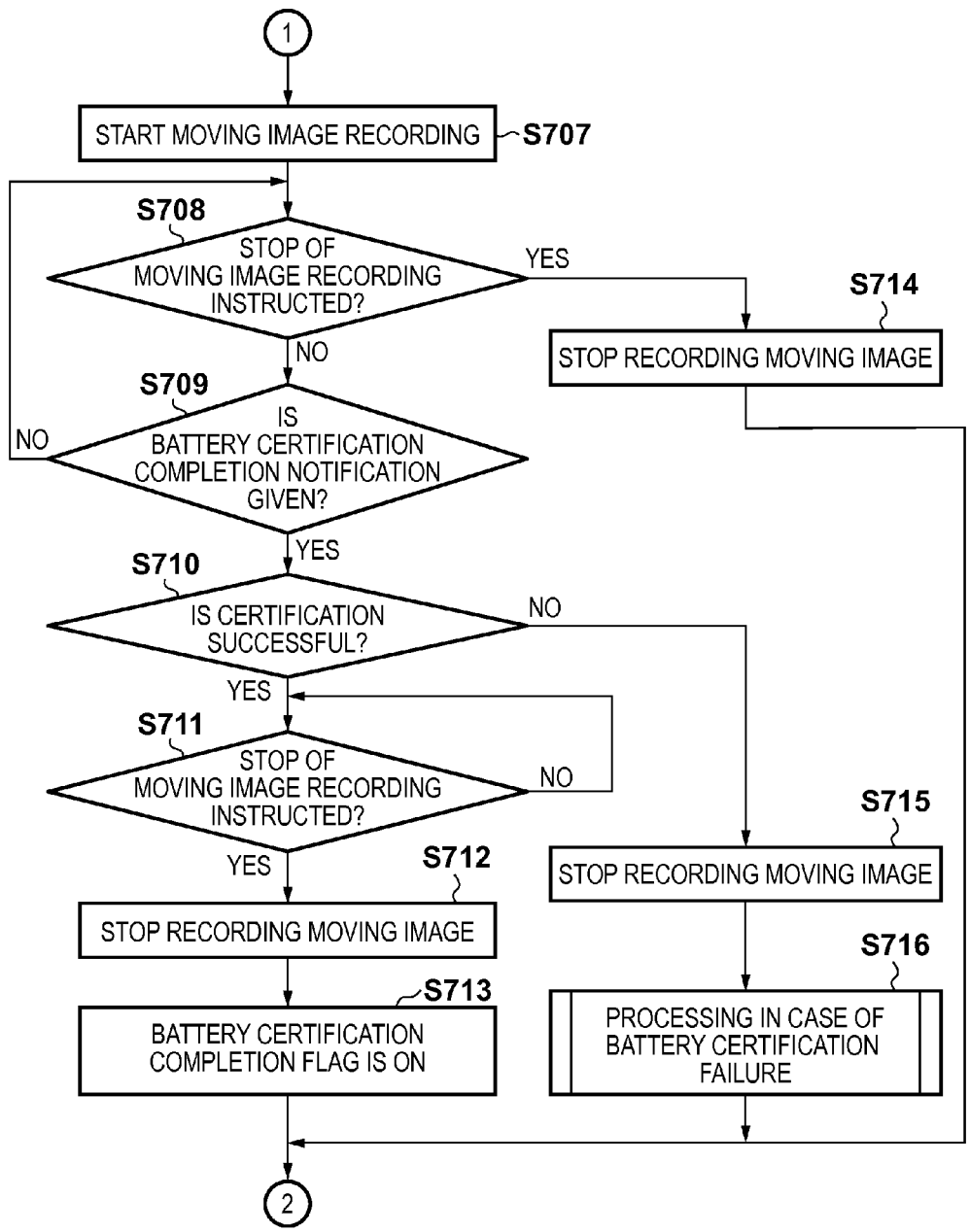

The following will describe the processing in the moving image recording mode in step S408 of FIG. 4 with reference to FIGS. 7A and 7B.

Note that processes in steps S701 to S705, and steps S717 to S720 of FIG. 7A are respectively the same as those in steps S601 to S605 and steps S611 to S614 of FIG. 6. Accordingly, the following will describe mainly the difference from FIG. 6.

In step S706, the system control unit 201 determines whether or not the moving image recording button 105 has been pressed down and an instruction to start recording a moving image has been given. As a result of the determination, if an instruction to start recording a moving image has been given, the process advances to step S707, and otherwise to step S717. In step S707, the system control unit 201 starts moving image recording processing. That is, moving image data that was recorded after the start of the processing is written in the recording medium 110. Accordingly, since it is possible to start recording a moving image even before battery certification is completed (NO in step S703), the user can start recording a moving image without missing a sudden shooting opportunity. When a genuine battery is used, recording the moving image can be continued even after completion of the battery certification as will be described later, and it is possible to prevent the user from missing a shooting opportunity because the user has to wait to start recording the moving image until the battery certification is completed.

In step S708, the system control unit 201 determines whether or not an instruction to stop recording a moving image has been given. As a result of the determination, if an instruction to stop recording a moving image has been given, the process advances to step S714, and otherwise to step S709.

In step S709, the system control unit 201 determines whether or not a battery certification completion notification has been received from the battery certification unit 218. As a result of the determination, if a battery certification completion notification has been received, the process advances to step S710, and otherwise returns to step S708.

In step S710, the system control unit 201 determines whether or not the battery certification unit 218 has succeeded in battery certification. As a result of the determination, if the battery certification is successful, the process advances to step S711, and if the battery certification fails, the process advances to step S715.

In step S711, the system control unit 201 stands by until an instruction to stop recording a moving image is again given, and if an instruction to stop recording a moving image is given, the process advances to step S712.

In steps S712 and S713, the system control unit 201 stops the moving image recording processing, turns on the battery certification completion flag, and stores the turned on flag in the system memory 212, and the process advances to step S717.

In step S714, the system control unit 201 stops the moving image recording processing, and the process advances to step S717.

In step S715, the system control unit 201 stops the moving image recording processing, and the process advances to step S716. That is, in the moving image recording processing, it is possible to start recording a moving image before battery certification is completed, but recording of the moving image is immediately stopped if battery certification results in failure. With this, it is possible to suppress a defect such as a malfunction of the digital camera due to heat generated by moving image recording processing, which is processing that has a prolonged processing time and a high processing load as well, being continuously performed using a battery that is not a genuine battery. Note that, in this case, a moving image for a short time period from turning on of power to completion of battery certification is recorded, but this short moving image possibly becomes unnecessary, and thus a configuration is also possible in which the entire moving image (moving image file) is deleted afterward.

In step S716, the system control unit 201 executes the processing in case of a battery certification failure. In this processing in case of a battery certification failure, as described with reference to FIG. 5, there may be the case where the power is turned off.

Note that, although the present embodiment describes the case where, in the moving image recording mode, the processing is suspended (stopped) in case of a certification failure as an example, the processing may also be performed without being suspended even in case of a certification failure if recording for a short time period of about a few seconds is performed. This is because, processing for a short time period of about a few seconds is less likely to cause the defect or an adverse effect due to use of a battery that is not a genuine battery, even if the processing is performed to the end.

<Processing in Reproduction Mode>

Hereinafter, the processing in the reproduction mode in step S409 of FIG. 4 will be described with reference to FIGS. 8A and 8B.

Figure 8A:
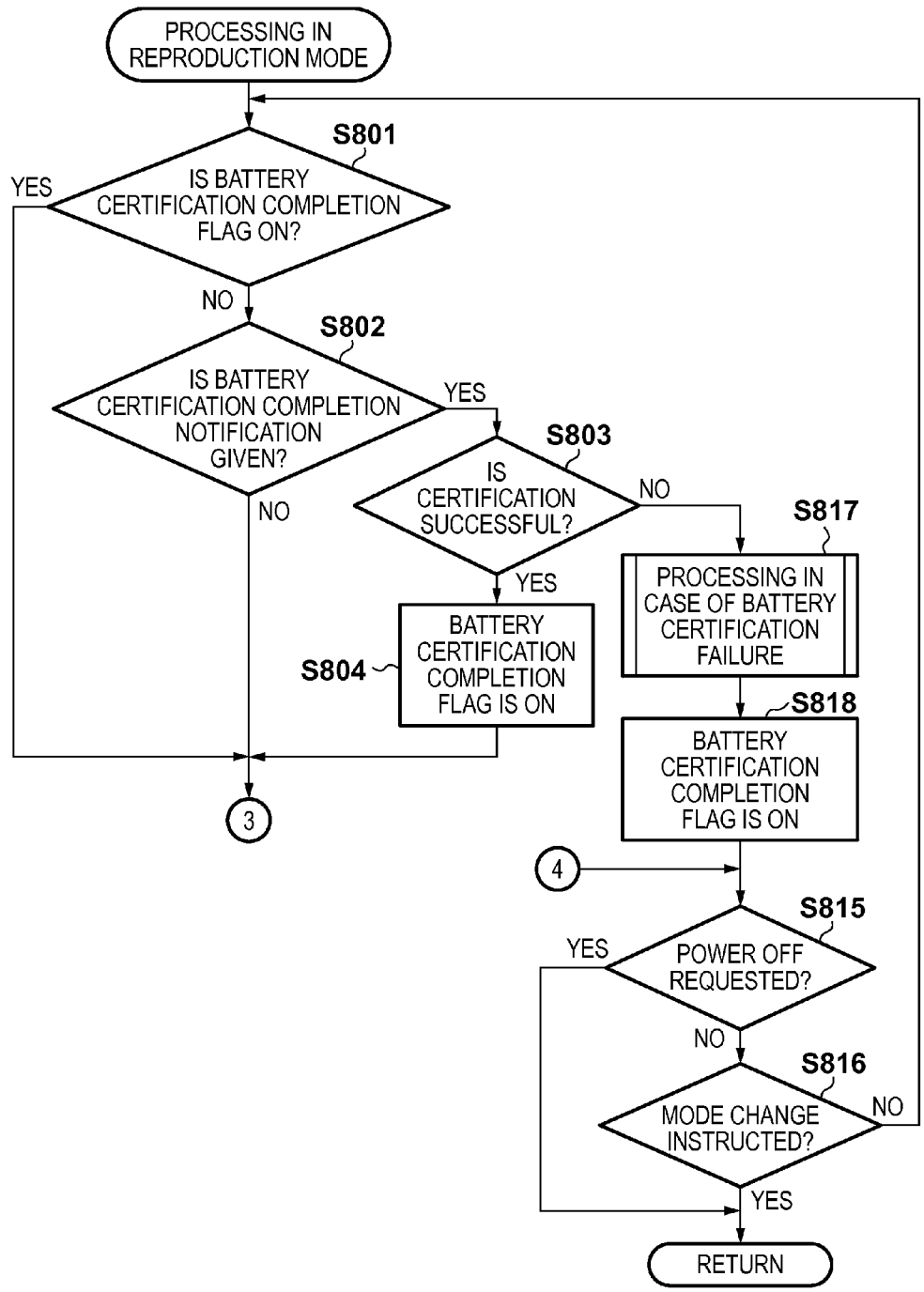
FIGS. 8A and 8B are flowcharts illustrating processing in a reproduction mode of FIG. 4.
Figure 8B:
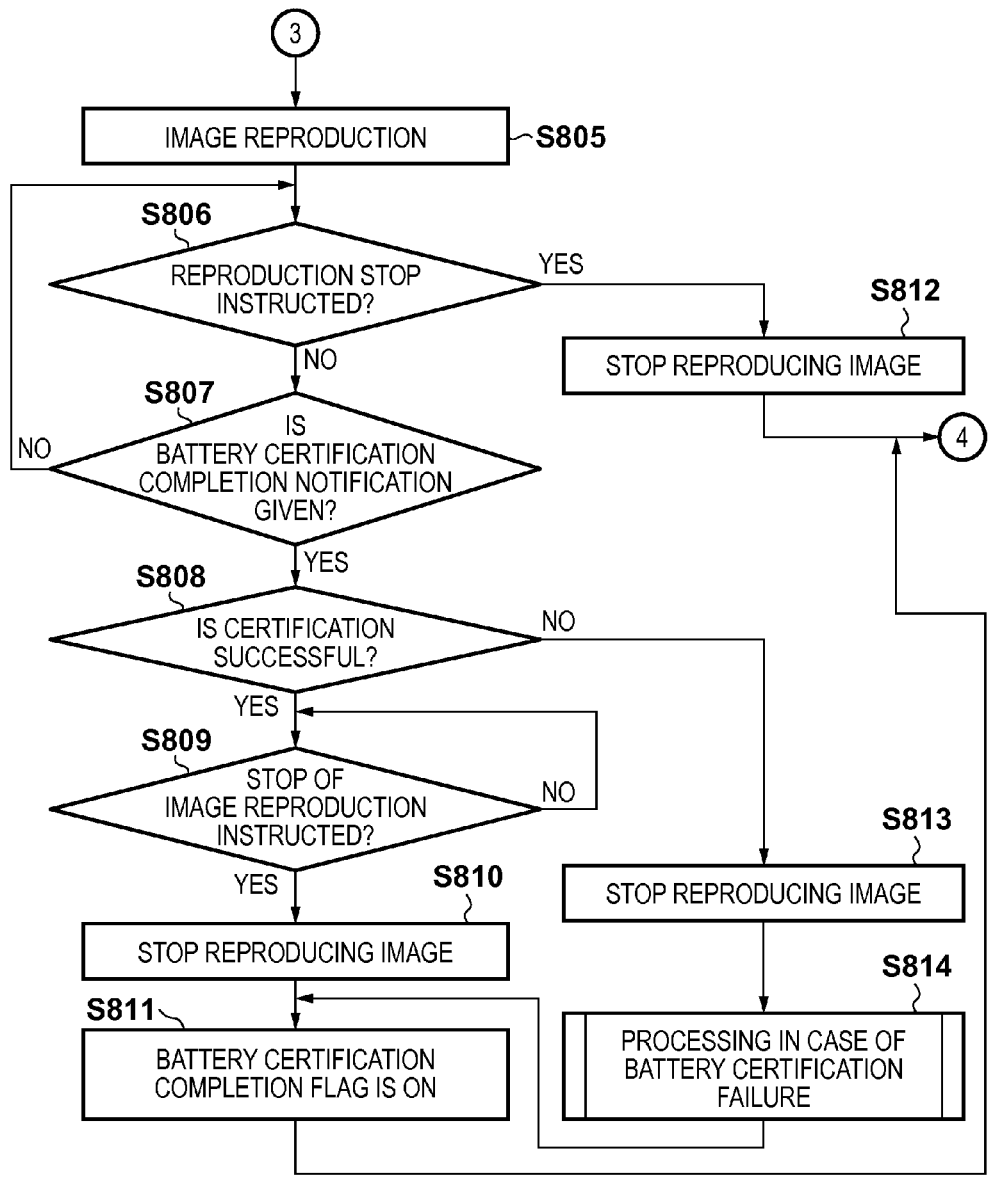

Note that the processes in steps S801 to S804 and steps S815 to S818 of FIG. 8A are respectively the same as those in steps S602 to S605 and steps S611 to S614 of FIG. 6. Accordingly, the following will describe mainly the difference from FIG. 6.

In step S805, the system control unit 201 reproduces an image file (a still image or moving image) recorded in the recording medium 110. The image file to be reproduced is an image file that is selected by a user from a file list screen, an image file that is automatically reproduced in the order of the file name, or the like.

In step S806, the system control unit 201 determines whether or not a reproduction stop instruction has been given. As a result of the determination, if a reproduction stop instruction has been given, the process advances to step S812, and otherwise to step S807.

In step S807, the system control unit 201 determines whether or not a battery certification completion notification has been received from the battery certification unit 218. As a result of the determination, if a battery certification completion notification has been received, the process advances to step S808, and otherwise returns to step S806.

In step S808, the system control unit 201 determines whether or not the battery certification unit 218 has succeeded in battery certification. As a result of the determination, if battery certification is successful, the process advances to step S809, and otherwise to step S813.

In step S809, the system control unit 201 stands by until a reproduction stop instruction is again given, and when a reproduction stop instruction is given, the process advances to step S811.

In steps S813 and S814, the system control unit 201 stops reproducing the image, turns on the battery certification completion flag, and stores the turned on flag in the system memory 212, and the process advances to step S815. Accordingly, reproduction of an image, for example, moving image reproduction itself can be started before battery certification is completed, but in case of a certification failure (the battery is determined not to be a genuine battery), reproducing the moving image is stopped at the time of completion of battery certification.

Accordingly, in the reproduction mode, it is possible to start reproducing an image before completion of battery certification, but the reproduction is immediately stopped when certification fails (the battery is determined not to be a genuine battery). With this, it is possible to reproduce an image promptly, irrespective of whether or not battery certification has been completed, and thus the user can view the image without waiting for it. On the other hand, in case of a certification failure, it is possible to suppress a defect in which a digital camera generates heat and malfunctions due to moving image reproducing processing, which has a prolonged processing time period and a high processing load as well, being continuously performed using a battery that is not a genuine battery.

<Processing in External Apparatus Connecting Mode>

Figure 9A:
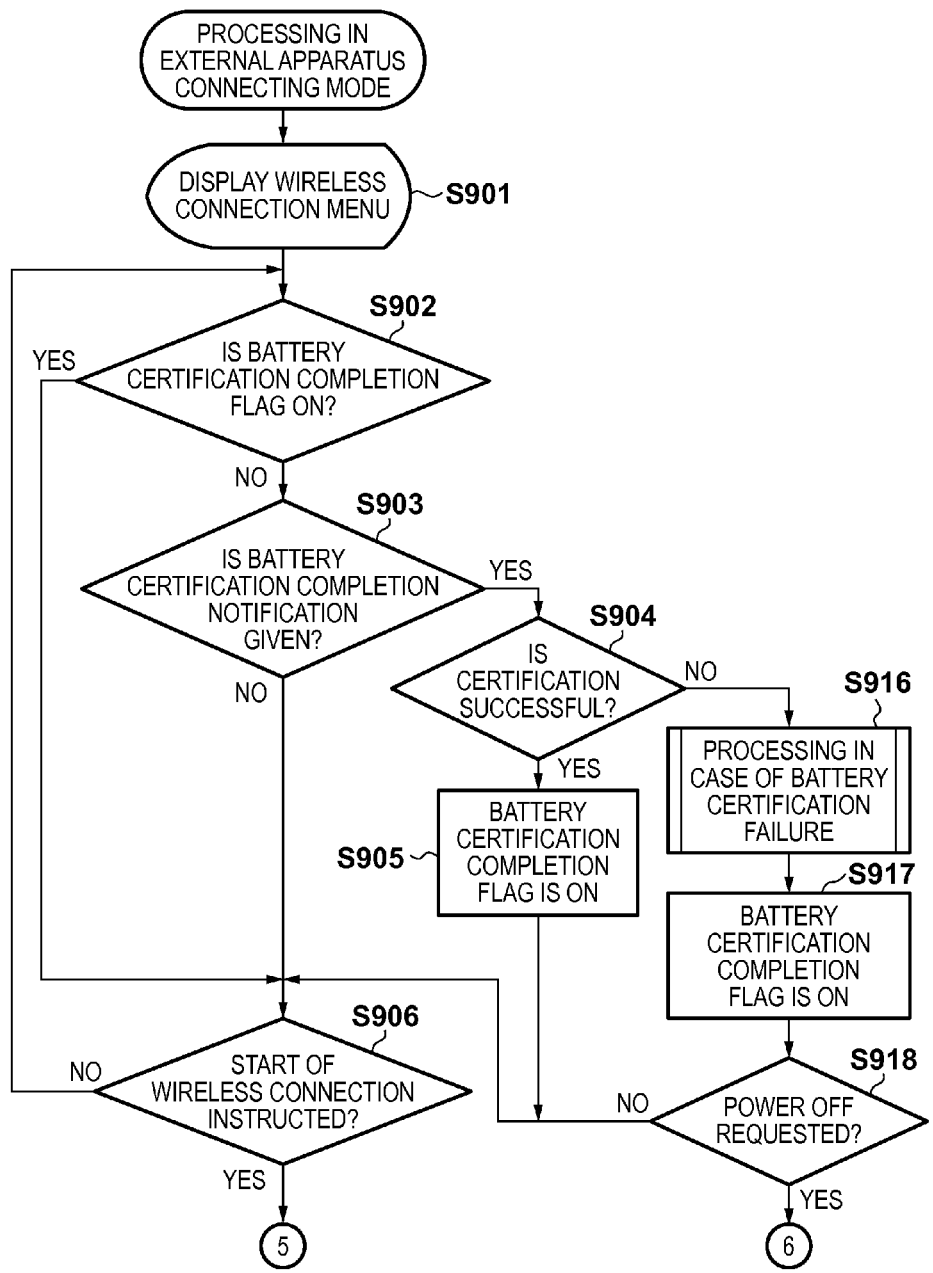
FIGS. 9A and 9B are flowcharts illustrating processing in an external apparatus connecting mode of FIG. 4.
Figure 9B:
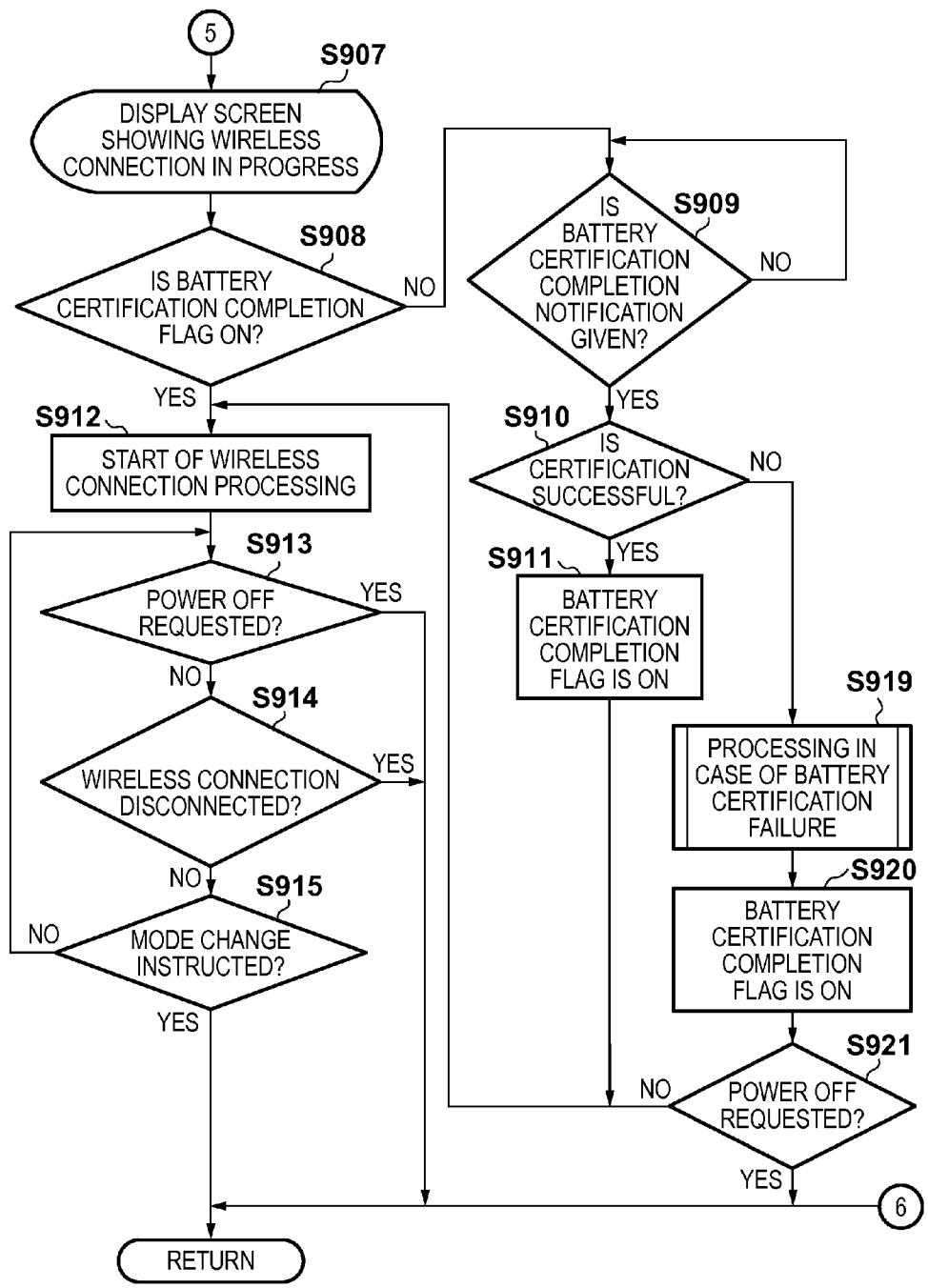

The following will describe the processing in the external apparatus connecting mode in step S410 of FIG. 4 with reference to FIGS. 9A and 9B, taking the case where wireless connection with an external apparatus is performed, as an example.

Note that processes in steps S902 to S905, S916 (S919), and S917 (S920) of FIG. 9A are respectively the same as those in steps S602 to S605, S613, and S614 of FIG. 6. Accordingly, the following will describe mainly the difference from FIG. 6.

In step S901, the system control unit 201 displays, on the display unit 101, a wireless connection menu screen as shown in FIG. 11D.

In step S906, the system control unit 201 determines whether or not an instruction to start wireless connection has been given by a user operation. As a result of the determination, if an instruction to start wireless connection has been given, the process advances to step S907, and otherwise returns to step S902. Note that the user operation relating to the instruction to start wireless connection includes selection of a connection method (whether or not a camera is used as an access point, connection is performed via another access point, or the like), selecting operation of a connection counterpart device (that may include inputting of a connection ID such as SSID), and giving an instruction to start executing connection with the selected connection counterpart device.

In step S907, the system control unit 201 displays, on the display unit 101, a connection standby screen as shown in FIG. 11E that notifies the user that processing for performing wireless connection is in progress.

In step S908, the system control unit 201 determines whether or not the battery certification completion flag is on, that is, battery certification has been completed. As a result of the determination, if battery certification has been completed, the process advances to step S912, and otherwise to step S909.

In step S909, the system control unit 201 stands by until receiving a battery certification completion notification from battery certification unit 218, and if a battery certification completion notification is received, the processing advances to step S910. That is, although an operation for wireless connection or an instruction to execute to start wireless connection can be accepted even before battery certification is completed, actual connection processing is not performed until battery certification is completed. This is because, at the time of completion of battery certification, there is still possibility that power is turned off due to a certification failure, and even if connection is established, the connection may be disconnected immediately. If connection is disconnected immediately after the connection is established, it may be a waste of consumed power and a processing load of an external apparatus, which serves as a connection counterpart. Accordingly, in order to prevent immediate disconnection after connection has been established as a result of battery certification, connection is not established until battery certification is completed. However, in order not to damage handling of the user, an operation until an instruction to start wireless connection is accepted even before battery certification is completed.

In step S910, the system control unit 201 determines whether or not the battery certification unit 218 has succeeded in battery certification. As a result of the determination, if battery certification is successful, the process advances to step S911, and if battery certification fails, the process advances to step S919.

In step S911, the system control unit 201 turns on the battery certification completion flag, and stores the turned on flag in the system memory 212, and the process advances to step S912.

In step S912, the system control unit 201 starts wireless connection processing, and transits to a wireless connection state.

In step S913, the system control unit 201 determines whether or not there is a power off request. As a result of the determination, if there is not a power off request, the process advances to step S914, and if there is a power off request, the system control unit 201 ends the present processing.

In step S914, the system control unit 201 determines whether or not the wireless connection is disconnected. As a result of the determination, if the wireless connection is not disconnected, the process advances to step S915, and if the wireless connection is disconnected, the system control unit 201 ends the present processing.

In step S915, it is determined whether or not a mode change instruction has been given using the mode switching button 104, and if a mode change instruction has not been given, the process returns to step S913, and if a mode change instruction has been given, the system control unit 201 ends the present processing.

Furthermore, in step S918 (S921), if there is not a power off request, the system control unit 201 advances to step S906 (S912), and if there is a power off request, the system control unit 201 ends the present processing.

Examples of a method for performing wireless connection to an external apparatus as in the present embodiment include Wi-Fi, Bluetooth (registered trademark), infrared communication, and the like. Furthermore, the present embodiment is also applicable to the case where connection to an external apparatus, such as a PC or printer, is performed via a wired line such as a Universal Serial Bus (USB). Specifically, if connection to a printer is performed, it is conceivable that printing preparation processing that needs ink or toner consumption is performed on the printer side at the time of connection establishment, but the present embodiment can reduce the possibility that this printing preparation processing is wastefully performed and wastes ink or toner.

Accordingly, in the external apparatus connecting mode, connection is not interrupted in case of a certification failure by delaying start of connection to an external apparatus until battery certification is completed, making it possible to reduce an influence on a connection counterpart device. Furthermore, since connection to an external apparatus is not started but a connection operation by a user is allowed, it is possible to alleviate a user's feeling of waiting for a longer time during processing. Furthermore, in case of a certification success, it is possible to prevent the user from being aware of battery certification processing.

<Processing in Menu Mode>

Figure 10:
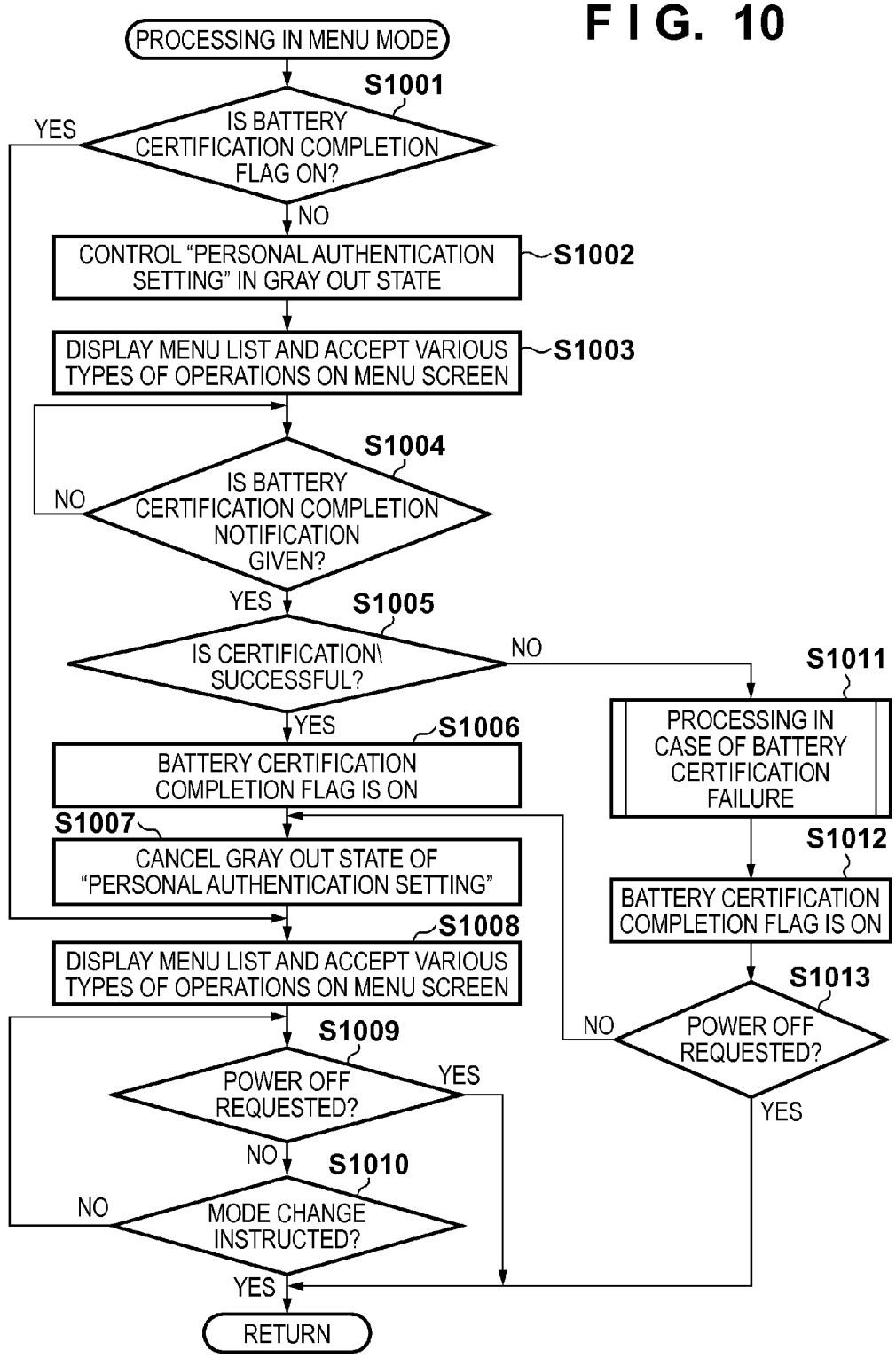
FIG. 10 is a flowchart illustrating processing in a menu mode of FIG. 4.

The following will describe the processing in the menu mode in step S411 of FIG. 4 with reference to FIG. 10.

Note that the processes in steps S1004 to S1006 and S1009 to S1012 of FIG. 10 are respectively the same as those in steps S603 to S605 and S611 to S614 of FIG. 6. Accordingly, the following will describe mainly the difference from FIG. 6.

In step S1001, the system control unit 201 determines whether or not the battery certification completion flag is on, that is, battery certification has been completed, and if battery certification has been completed, the process advances to step S1008, and otherwise to step S1002.

In step S1002, the system control unit 201 generates data for screen display so that the selection item "personal authentication setting" in the menu screen as shown in FIG. 11F is grayed out.

In step S1003, the system control unit 201 displays, on the display unit 101, a menu screen as shown in FIG. 11F, and accepts various types of operations on the displayed menu screen from a user. In the menu screen shown in FIG. 11F, the item "personal authentication setting" in the lowermost row of the screen is displayed in the grayed-out state (the display state changed from the normal display state). The user can neither select the item "personal authentication setting", of the items displayed in the menu screen, nor perform a setting processing operation relating to personal authentication. Other items can be selected.

In step S1007, the system control unit 201 cancels the grayed-out state of the selection item "personal authentication setting" in the menu screen as shown in FIG. 11F.

In step S1008, the system control unit 201 displays, on the display unit 101, a menu screen as shown in FIG. 11G, and accepts various types of operations on the displayed menu screen from a user. Note that in the case where the process advances from step S1007 to step S1008, the menu screen is not newly displayed but display aspect of the item "personal authentication setting" in the displayed menu screen is changed. The menu screen shown in FIG. 11G differs from that of FIG. 11F, and the item "personal authentication setting" is not grayed out. If the user selects the item "personal authentication setting", the user can perform, in the lower stage thereof, operations of (1) to (4) described below, for example.

(1) Setting of personal authentication to "enabled" or "not enabled". In the case where personal authentication is set to "enabled", when a face detected from a through image at the time of shooting is determined as a registered person, the name of the registered person is displayed while being superimposed on the through image. Furthermore, face AF in which the registered person is preferentially focused on is performed.

(2) An operation of registering information on a new person. The user shoots the face of a person who is desired to be registered, and feature data of the face is extracted from the shot image and registered in dictionary data that is stored in the nonvolatile memory 213.

(3) Editing of profile information of the registered person, such as the name or birthday.

(4) Deletion of the registered personal information.

Returning to FIG. 10, in steps S1009 and S1010, if there is a power off request, the system control unit 201 ends the present processing, and if there is not a power off request, the processes in steps S1009 and S1010 are repeated until a mode change instruction is given.

Furthermore, in step S1013, if there is a power off request, the system control unit 201 ends the present processing, and if there is not a power off request, the process advances to step S1007.

Accordingly, in the processing in the menu mode, the function relating to personal authentication setting, of the items in the menu screen, is grayed out before battery certification is completed so as to be unselectable, and it is possible to forbid execution of the function.

Note that the function whose execution is forbidden before battery certification is completed may also be an editing-related function, such as a function to edit a recorded moving image, or a function to create a new moving image by connecting still images, whose execution may be made impossible. Editing of a moving image has a particularly high processing load, and takes time from reception of an editing execution instruction until internal processing is completed. Therefore, if moving image editing processing is started before battery certification is completed, battery certification may be completed before the editing processing is completed, that is, during the editing processing. Furthermore, in case of a certification failure, power may be turned off without editing processing being completed. In order to prevent such a situation, processing for editing a moving image is not started until battery certification is completed. Note that, in the case of a design in which processing for editing a moving image starts before battery certification is completed, it is suitable to suspend the editing processing in case of a certification failure, similarly to the moving image shooting. This is because, since the moving image editing has a high processing load and takes time, the risk of a defect increases when the moving image editing is performed using a low quality counterfeit battery.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, an apparatus having a battery certification function and personal authentication function and the like. More specifically, the present invention is applicable to a personal computer, a PDA (Personal Digital Assistant), a mobile telephone terminal, a mobile image viewer, a printer having a display, a digital photo frame, a music player, a game console, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application Nos. 2013-273177 and 2013-273178, filed Dec. 27, 2013, which are hereby incorporated by references herein in their entirety.

What is claimed is:

1. An electronic apparatus comprising:
    a memory and at least one processor which function as:
    a certification unit configured to certificate a mounted battery; and
    a control unit configured to perform control such that,
        if an instruction to execute first processing is given before certification processing by the certification unit is completed, the first processing is not executed before the certification processing is completed, and
        if an instruction to execute second processing is given before the certification processing by the certification unit is completed, the second processing is executed before the certification processing is completed,
    wherein the control unit performs control such that, in the case where the instruction to execute the first processing is given before the certification processing is completed, and the first processing is not executed before the certification processing is completed, the first processing is executed if certification is successful after the certification processing is completed.

2. The apparatus according to claim 1, wherein the at least one processor further functions as:
    a display control unit configured to perform control so as to display a confirmation screen relating to the battery if the certification processing by the certification unit is completed and certification is not successful.

3. The apparatus according to claim 2, wherein the display control unit performs control so as to display the confirmation screen if the instruction to execute the first processing is given before the certification processing by the certification unit is completed, and certification is not successful after the certification processing is completed.

4. The apparatus according to claim 2, wherein the at least one processor further functions as:
a power control unit configured to turn off power of the electronic apparatus in response to a selection operation of a user with respect to one of a plurality of selection items displayed on the confirmation screen.

5. The apparatus according to claim 1, wherein the first processing includes connection processing to an external apparatus.

6. The apparatus according to claim 5, wherein the control unit accepts a selection of an external apparatus to connect to, and an instruction to execute connection processing to the selected external apparatus before the certification processing is completed.

7. The apparatus according to claim 6, wherein the control unit performs control so as to display, if an instruction to execute the connection processing is given before the certification processing by the certification unit is completed, a connection standby screen without performing the connection processing before the certification processing is completed.

8. The apparatus according to claim 1, wherein the first processing includes setting processing relating to personal authentication in which a registered person's face is detected from an image.

9. The apparatus according to claim 1, wherein the first processing includes moving image editing processing.

10. The apparatus according to claim 1, wherein the at least one processor further functions as:
an image capturing unit,
wherein the second processing includes processing that includes image capturing by the image capturing unit.

11. The apparatus according to claim 10, wherein the second processing includes still image shooting processing by the image capturing unit.

12. The apparatus according to claim 10, wherein the second processing includes moving image recording processing by the image capturing unit.

13. The apparatus according to claim 1, wherein the second processing includes image reproducing processing.

14. A control method of an electronic apparatus comprising:
certifying a mounted battery;
performing control such that,
if an instruction to execute first processing is given before the certification processing is completed, the first processing is not executed before the certification processing is completed, and
if an instruction to execute second processing is given before the certification processing is completed, the second processing is executed before the certification processing is completed; and
performing control such that,
in the case where the instruction to execute the first processing is given before the certification processing is completed, and the first processing is not executed before the certification processing is completed, the first processing is executed if certification is successful after the certification processing is completed.

15. An electronic apparatus comprising:
a memory and at least one processor which function as:
a certification unit configured to certificate a mounted battery; and
a control unit configured to perform control such that:
first processing is started before certification processing by the certification unit is completed, and the first processing is stopped if the certification processing by the certification unit is completed after the start of the first processing, and the certification is not successful, and
second processing is started before the certification processing by the certification unit is completed, and the second processing is continued if the certification processing by the certification unit is completed after the start of the second processing, and the certification is not successful,
wherein in both the first processing and the second processing, the started processing is continued when the certification processing by the certification unit is completed after the start of the processing and the certification is successful.

16. The apparatus according to claim 15, wherein the first processing is moving image recording processing by an image capturing unit.

17. The apparatus according to claim 15, wherein the second processing is moving image recording processing for a predetermined time period.

18. The apparatus according to claim 15, wherein the second processing is still image shooting processing by an image capturing unit.

19. The apparatus according to claim 18, wherein the still image shooting processing includes processing for reading a signal from the image capturing unit, image processing for converting the read signal into an image file, and processing for writing the image file into a recording medium.

20. The apparatus according to claim 15, wherein the at least one processor further functions as:
a display control unit configured to perform control so as to display a confirmation screen relating to the battery to a user if the certification processing by the certification unit is completed before the first and second processing are started, and certification is not successful.

21. The apparatus according to claim 20, wherein the display control unit performs control so as to display, if the certification processing by the certification unit is completed after the start of the second processing, and certification is not successful, the confirmation screen after the continued second processing is completed.

22. The apparatus according to claim 20, wherein the at least one processor further functions as:
a power control unit configured to turn off power of the electronic apparatus in response to a selection operation of a user with respect to one of a plurality of selection items displayed on the confirmation screen.

23. The apparatus according to claim 15, wherein the first processing is moving image reproducing processing.

24. A control method of an electronic apparatus comprising the steps of:
certifying a mounted battery; and
performing control such that;
if first processing is started before certification processing is completed, the certification processing is completed after the start of the first processing, and if certification is not successful, the first processing is stopped, and
if second processing is started before the certification processing is completed, the certification processing is completed after the start of the second processing, and if certification is not successful, the second processing is continued,
wherein in both the first processing and the second processing, the started processing is continued when the certification processing by the certification unit is completed after the start of the processing and the certification is successful.

25. A non-transitory computer-readable storage medium storing a program for causing a computer to execute a control method of an electronic apparatus comprising:
certifying a mounted battery;
performing control such that,
if an instruction to execute first processing is given before the certification processing is completed, the first processing is not executed before the certification processing is completed, and
if an instruction to execute second processing is given before the certification processing is completed, the second processing is executed before the certification processing is completed; and
performing control such that,
in the case where the instruction to execute the first processing is given before the certification processing is completed, and the first processing is not executed before the certification processing is completed, the first processing is executed if certification is successful after the certification processing is completed.

26. A non-transitory computer-readable storage medium storing a program for causing a computer to execute a control method of an electronic apparatus comprising:
certifying a mounted battery; and
performing control such that;
if first processing is started before certification processing is completed, the certification processing is completed after the start of the first processing, and if certification is not successful, the first processing is stopped, and
if second processing is started before the certification processing is completed, the certification processing is completed after the start of the second processing, and if certification is not successful, the second processing is continued,
wherein in both the first processing and the second processing, the started processing is continued when the certification processing by the certification unit is completed after the start of the processing and the certification is successful.

27. An electronic apparatus comprising:
a memory and at least one processor which function as:
a certification unit configured to certificate a mounted battery;
a control unit configured to perform control such that,
if an instruction to execute first processing is given before certification processing by the certification unit is completed, the first processing is not executed before the certification processing is completed, and
if an instruction to execute second processing is given before the certification processing by the certification unit is completed, the second processing is executed before the certification processing is completed; and
an image capturing unit,
wherein the second processing includes processing that includes image capturing by the image capturing unit.

28. The apparatus according to claim 27, wherein the second processing includes still image shooting processing by the image capturing unit.

29. The apparatus according to claim 28, wherein the first processing includes at least one of connection processing to an external apparatus, setting processing relating to personal authentication and moving image editing processing.

30. The apparatus according to claim 27, wherein the second processing includes moving image recording processing by the image capturing unit.

31. An electronic apparatus comprising:
a memory and at least one processor which function as:
a certification unit configured to certificate a mounted battery; and
a control unit configured to perform control such that,
if an instruction to execute first processing is given before certification processing by the certification unit is completed, the first processing is not executed before the certification processing is completed, and
if an instruction to execute second processing is given before the certification processing by the certification unit is completed, the second processing is executed before the certification processing is completed,
wherein the second processing includes image reproducing processing.

32. The apparatus according to claim 31, wherein the first processing includes at least one of connection processing to an external apparatus, setting processing relating to personal authentication and moving image editing processing.

33. A non-transitory computer-readable storage medium storing a program for causing a computer to execute a control method of an electronic apparatus comprising:
certifying a mounted battery; and
performing control such that,
if an instruction to execute first processing is given before the certification processing is completed, the first processing is not executed before the certification processing is completed, the first processing including connection processing to an external apparatus, and
if an instruction to execute second processing is given before the certification processing is completed, the second processing is executed before the certification processing is completed;
wherein the second processing includes image capturing processing.

34. A non-transitory computer-readable storage medium storing a program for causing a computer to execute a control method of an electronic apparatus comprising:
certifying a mounted battery; and
performing control such that,
if an instruction to execute first processing is given before the certification processing is completed, the first processing is not executed before the certification processing is completed, the first processing including connection processing to an external apparatus, and
if an instruction to execute second processing is given before the certification processing is completed, the second processing is executed before the certification processing is completed;
wherein the second processing includes image reproducing processing.

35. An electronic apparatus comprising:
a memory and at least one processor which function as:
a certification unit configured to certificate a mounted battery; and
a control unit configured to perform control such that:
first processing is started before certification processing by the certification unit is completed, and the first processing is stopped if the certification processing by the certification unit is completed after the start of the first processing, and the certification is not successful, and second processing is started before the certification processing by the certification unit is completed, and the second processing is continued if the certification processing by the certification unit is completed after the start of the second processing, and the certification is not successful, wherein the second processing is still image shooting processing by an image capturing unit.

36. The apparatus according to claim 35, wherein the first processing is moving image recording processing by an image capturing unit.

37. The apparatus according to claim 35, wherein the still image shooting processing includes processing for reading a signal from the image capturing unit, image processing for converting the read signal into an image file, and processing for writing the image file into a recording medium.

38. A non-transitory computer-readable storage medium storing a program for causing a computer to execute a control method of an electronic apparatus comprising:

certifying a mounted battery; and performing control such that;

first processing is started before certification processing by the certification unit is completed, and the first processing is stopped if the certification processing by the certification unit is completed after the start of the first processing, and the certification is not successful, and second processing is started before the certification processing by the certification unit is completed, and the second processing is continued if the certification processing by the certification unit is completed after the start of the second processing, and the certification is not successful, wherein the second processing is still image shooting processing by an image capturing unit.

* * * * *